Oct. 31, 1933.  E. H. FREIBURGHOUSE  1,933,324
POWER PLANT
Filed Jan. 28, 1933
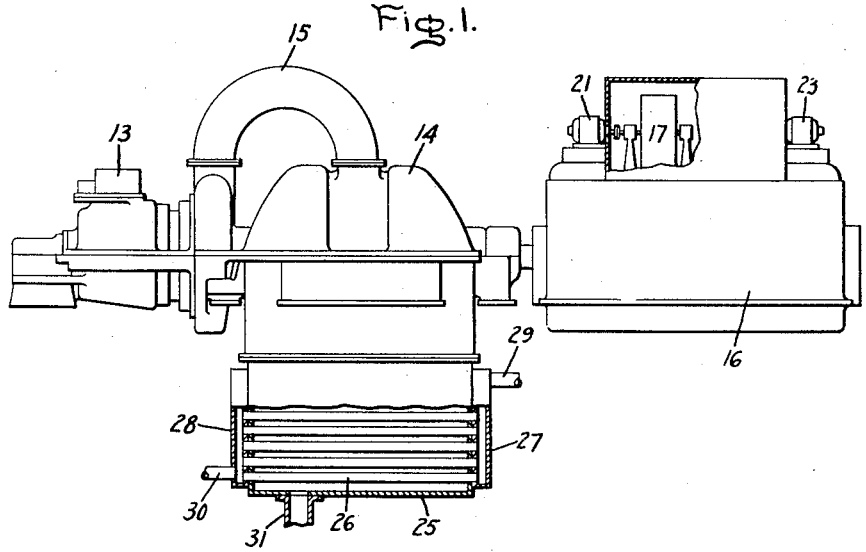
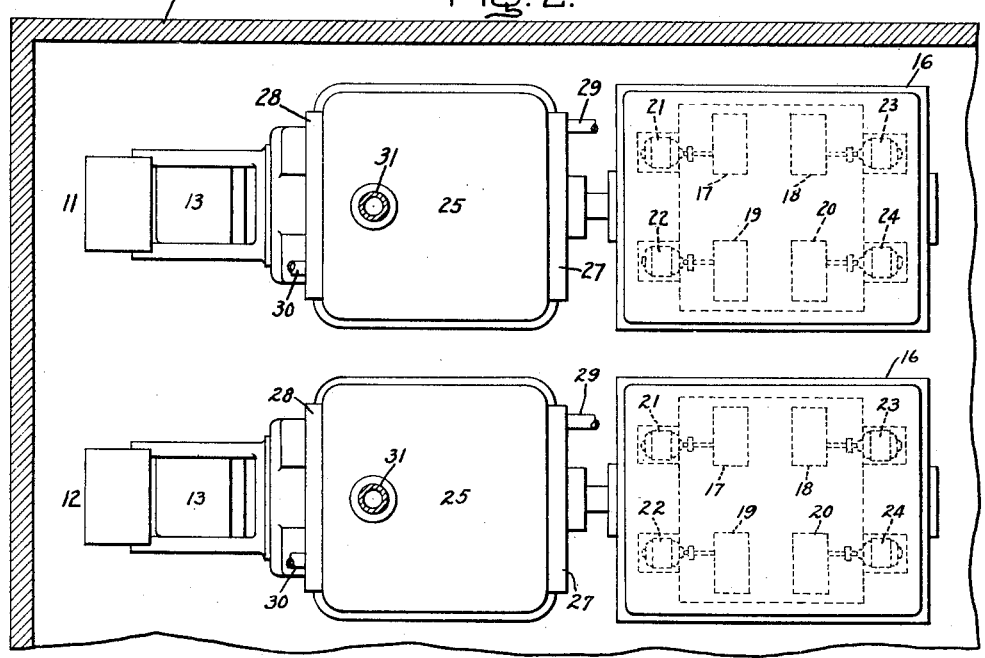
Inventor:
Edward H. Freiburghouse,
by Charles V. Tulla
His Attorney.

Patented Oct. 31, 1933

1,933,324

UNITED STATES PATENT OFFICE 1,933,324

POWER PLANT

Edward H. Freiburghouse, Schenectady, N. Y., assignor to General Electric Company, a corporation of New York Application January 28, 1933. Serial No. 654,077

3 Claims. (Cl. 290—4)

The present invention relates to power plants comprising one or a plurality of sets of turbo-generators including a condenser or condensers for condensing the exhaust elastic fluid of the turbo-generators and blowers for supplying cooling medium to the electric generators.

The object of my invention is to provide an improved arrangement of the different parts of a power plant above specified whereby certain of these parts become more accessible and considerable floor space is saved.

For a consideration of what I consider to be novel and my invention, attention is directed to the following description and the claims appended thereto in connection with the accompanying drawing in which Fig. 1 represents a front view, and Fig. 2 a bottom view of a power plant embodying my invention.

The power plant shown in the drawing comprises an outer wall 10 defining a space in which are provided one or more turbo-generators adjacent each other. In the present instance I have shown two turbo-generator sets 11 and 12. Each of the sets comprises a high pressure turbine 13 having its exhaust end connected to a low pressure turbine 14 by means of a conduit 15. A generator 16 for each set is arranged in alignment with and driven by the turbines 13, 14 respectively.

The arrangement so far described may be taken as typical of any kind of power plant of this type. As stated above, my invention relates to the type of power plants in which the turbine is provided with a condensing means and the generator with means for supplying cooling air thereto. Heretofore it has been the practice to arrange cooling means, more specifically a blower and a motor underneath the generator. This made it necessary to arrange the condenser underneath the low pressure turbine in such a manner that the tubes of the condenser had to be assembled and dismantled sidewise, that is, in a direction coaxial to the axis of the turbo-generator. For assembling and dismantling of the condenser it was therefore necessary to provide between adjacent turbo-generator sets or between one set and the wall of the power plant space of sufficient width to permit the assembling and dismantling of the condenser tubes. The arrangement is in accordance with my invention considerably simplified by the provision of the cooling means on top of the generator. Preferably I provide a plurality of cooling means to minimize the height of the structure to be arranged on top of the generator.

In the embodiment illustrated in the drawing, I have shown cooling means comprising four blowers 17, 18, 19 and 20 arranged on top of each of the two generators. The blowers are driven by separate motors 21, 22, 23 and 24 respectively. The provision of four blowers for each generator decreases the height of the structure and accordingly the necessary height of the power plant. With the provision of the cooling means for the generator on top thereof I obtain free space underneath it sufficient to permit the arrangement of a condenser for the turbine with the cooling tubes for the condenser arranged in a direction parallel to the axis of the turbine. In the present instance I have shown a condenser 25 fastened to the exhaust end of the turbine casing. The condenser comprises a plurality of tubes 26 arranged in accordance with my invention parallel to the turbine shaft. The ends of the tubes communicate with headers 27 and 28 respectively. A cooling medium such as water is conducted to header 27 by a conduit 29 and discharged from header 28 by a conduit 30. During operation, cooling medium is circulated through the condenser tubes and thereby causes condensation of the exhaust elastic fluid of the turbine. The condensate is drained from the condenser by a conduit 31.

The arrangement of the cooling means on top of the generator does not necessitate an increased overall height owing to the fact that the turbine structure generally is higher than the generator, particularly in the case of compound turbines where the elastic fluid is conducted from the high pressure to the low pressure part by a conduit assuming considerable dimensions in height. In other words, in ordinary arrangements there is always a sufficient space available above the generator to provide therein cooling means for the latter. The arranging of the cooling means on top of the generator, however, makes sufficient space available underneath the generator to permit assembling and dismantling of the cooling tubes of the turbine condenser in a direction parallel to the axis of the turbo-generator and the replacement of broken tubes. The axial arrangement of the condenser cooling tubes permits the placing of one or a plurality of generators close to each other and close to the wall of the power plant. All that is required is to leave sufficient space between the turbo-generators and the wall of the power plant to permit the operator to inspect the plant.

Thus, my improved arrangement permits a more compact arrangement of the power plant, resulting in a decreased width of the power plant house and accordingly a decreased initial cost of such a structure.

What I claim as new and desire to secure by Letters Patent of the United States, is:

1. In a power plant, a turbine, a generator in axial alignment with and driven by the turbine, means for supplying cooling air to the generator provided on top of the same and a condenser for condensing the exhaust of the turbine provided underneath the turbine and including a plurality of cooling tubes arranged in a direction parallel to the axis of the turbine.

2. In a power plant, a turbine, a generator in axial alignment with and driven by the turbine, a plurality of blowers, a motor for each blower for forcing cooling air through the generator and a condenser for condensing the exhaust of the turbine provided underneath the turbine and including a plurality of cooling tubes arranged in a direction parallel to the axis of the turbine.

3. In a power plant, the combination of a high pressure turbine, a low pressure turbine receiving exhaust elastic fluid from the high pressure turbine, a generator in alignment with and driven by the turbines, cooling means comprising a plurality of blowers and a motor for each of the blowers for forcing cooling air through the generator, a condenser fastened to the exhaust of the low pressure turbine underneath said turbine and comprising a plurality of tubes extending in a direction parallel to the turbine shaft, the provision of the cooling means for the generator on top of the same permitting axial assembling and dismantling of the condenser tubes whereby the width of the power plant in coaxial direction to the turbo-generator may be decreased.

EDWARD H. FREIBURGHOUSE.